United States Patent
Slobodsky et al.

(10) Patent No.: US 12,277,196 B2
(45) Date of Patent: Apr. 15, 2025

(54) SYSTEM AND METHOD FOR ELECTRONIC DISTRIBUTION OF SOFTWARE AND DATA

(71) Applicant: BLOOMBERG FINANCE L.P., New York, NY (US)

(72) Inventors: Gennady Slobodsky, New York, NY (US); Vladimir Kliatchko, Dobbs Ferry, NY (US); Shawn Edwards, Stamford, CT (US); Claudio Storelli, New York, NY (US); Satoko Highstein, New York, NY (US); Thomas F. Secunda, Croton-on-Hudson, NY (US); Navanath Prabuhudessai, Hicksville, NY (US); Oleg Polonsky, Fair Lawn, NJ (US)

(73) Assignee: BLOOMBERG FINANCE L.P., New York, NY (US)

( * ) Notice: Subject to any disclaimer, the term of this patent is extended or adjusted under 35 U.S.C. 154(b) by 988 days.

(21) Appl. No.: 15/637,537

(22) Filed: Jun. 29, 2017

(65) Prior Publication Data
US 2017/0300667 A1      Oct. 19, 2017

Related U.S. Application Data

(63) Continuation of application No. 13/570,076, filed on Aug. 8, 2012, now abandoned.
(Continued)

(51) Int. Cl.
*G06F 21/10*      (2013.01)
*G06F 21/60*      (2013.01)
*G06Q 30/06*      (2023.01)

(52) U.S. Cl.
CPC ............ *G06F 21/10* (2013.01); *G06F 21/606* (2013.01); *G06Q 30/06* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 5,629,980 A | 5/1997 | Stefik et al. | |
| 5,892,900 A * | 4/1999 | Ginter | G06F 21/10 726/26 |

(Continued)

FOREIGN PATENT DOCUMENTS

| | | | | |
|---|---|---|---|---|
| BR | PI-02097419 B1 * | 12/2002 | | G06F 9/445 |
| EP | 1909220 A1 * | 4/2008 | | G06F 8/20 |
| RU | 2459238 C2 * | 8/2012 | | G06F 8/65 |

OTHER PUBLICATIONS

.NET Framework 4—Deploying the .NET Framework and Applications—.NET Framework Client Profile, retrieved Sep. 3, 2011 from https://web.archive.org/web/20110903074230/http://msdn.microsoft.com/en-us/library/cc656912.aspx (Year: 2011).*

(Continued)

*Primary Examiner* — Eduardo Castilho
(74) *Attorney, Agent, or Firm* — Chiesa Shahinian & Giantomasi PC

(57) ABSTRACT

According to computerized methods of distributing software and data, software components may be distributed electronically for execution in controlled environments. Such a controlled environment may, for example, restrict the components' ability to communicate through a network to one or more specified hosts. When a component requests data, such as a stream of financial data, the request may specify a source of the data, and the request may be granted or denied by the distributor based on whether the specified source is an authorized source of the data and/or whether the requested data is available from an authorized source.

20 Claims, 12 Drawing Sheets

Related U.S. Application Data

(60) Provisional application No. 61/521,192, filed on Aug. 8, 2011.

(56) References Cited

U.S. PATENT DOCUMENTS

| | | | |
|---|---|---|---|
| 5,917,912 A | 6/1999 | Ginter et al. | |
| 5,978,484 A * | 11/1999 | Apperson | G06F 21/125 713/170 |
| 6,275,938 B1 * | 8/2001 | Bond | G06F 21/53 714/38.13 |
| 6,651,171 B1 * | 11/2003 | England | G06F 12/1491 711/163 |
| 7,073,059 B2 * | 7/2006 | Worely, Jr. | G06F 9/4812 713/164 |
| 7,600,007 B1 * | 10/2009 | Lewis | G06Q 10/04 709/223 |
| 7,685,598 B1 * | 3/2010 | Badenell | G06F 8/65 717/173 |
| 7,921,299 B1 * | 4/2011 | Anantha | G06F 21/53 726/28 |
| 8,290,763 B1 | 10/2012 | Zhang | |
| 8,414,390 B1 * | 4/2013 | Paleja | A63F 13/358 463/43 |
| 8,452,797 B1 * | 5/2013 | Paleja | G06Q 30/02 707/767 |
| 8,799,680 B2 * | 8/2014 | Ferguson | G06F 12/1408 705/51 |
| 8,850,215 B2 * | 9/2014 | Gover | G06F 21/6281 713/182 |
| 9,391,826 B1 * | 7/2016 | Dayan | H04L 29/06 |
| 9,460,461 B1 * | 10/2016 | Gill | G06Q 30/0641 |
| 2002/0013910 A1 | 1/2002 | Edery et al. | |
| 2002/0053024 A1 * | 5/2002 | Hashimoto | G06F 21/125 713/168 |
| 2002/0107804 A1 * | 8/2002 | Kravitz | G06F 21/10 705/51 |
| 2003/0028451 A1 * | 2/2003 | Ananian | G06Q 30/0615 705/26.42 |
| 2005/0278787 A1 * | 12/2005 | Naslund | G06F 21/10 726/26 |
| 2006/0248504 A1 * | 11/2006 | Hughes | G06F 11/3664 717/101 |
| 2007/0038765 A1 * | 2/2007 | Dunn | G06F 21/6218 709/229 |
| 2007/0061396 A1 * | 3/2007 | Morris | G06Q 10/02 709/203 |
| 2007/0086372 A1 * | 4/2007 | Lee | G06F 21/10 370/328 |
| 2007/0226790 A1 * | 9/2007 | Maher | G06Q 30/02 726/18 |
| 2007/0233681 A1 * | 10/2007 | Ronen | G06Q 10/06 |
| 2008/0148414 A1 * | 6/2008 | Tom | G06F 21/10 726/29 |
| 2008/0319771 A1 * | 12/2008 | Shriver-Blake | G06Q 10/101 705/300 |
| 2008/0320583 A1 | 12/2008 | Sharma et al. | |
| 2009/0037287 A1 * | 2/2009 | Baitalmal | G06Q 30/0641 705/27.1 |
| 2009/0320051 A1 * | 12/2009 | Meerwald | G06F 21/629 719/331 |
| 2010/0274910 A1 * | 10/2010 | Ghanaie-Sichanie | G06F 40/143 709/229 |
| 2010/0324985 A1 * | 12/2010 | Kumar | G06Q 30/0202 706/46 |
| 2011/0082900 A1 * | 4/2011 | Nagpal | G06F 21/629 709/203 |
| 2011/0184806 A1 * | 7/2011 | Chen | G06Q 30/0257 705/347 |
| 2011/0270711 A1 * | 11/2011 | Kusterer | G06Q 30/04 709/217 |
| 2012/0030731 A1 * | 2/2012 | Bhargava | G06F 21/53 726/3 |
| 2012/0030750 A1 * | 2/2012 | Bhargava | H04L 63/1408 726/13 |
| 2012/0060031 A1 * | 3/2012 | Huang | H04N 21/8355 713/168 |
| 2012/0072312 A1 * | 3/2012 | Lange | G06Q 30/06 705/27.1 |
| 2012/0096071 A1 * | 4/2012 | Murphey | G06F 8/63 709/203 |
| 2013/0055211 A1 * | 2/2013 | Fosback | G06Q 10/06 717/126 |
| 2014/0075516 A1 * | 3/2014 | Chermside | G06F 21/10 726/4 |
| 2014/0337175 A1 * | 11/2014 | Katzin | G06Q 20/322 705/26.62 |
| 2015/0319299 A1 * | 11/2015 | Craswell | G06F 8/65 455/419 |

OTHER PUBLICATIONS

MacDonald, Matthew. Pro WPF in C# 2010: Windows Presentation Foundation in .NET 4. Netherlands, Apress, 2010. ISBN: 9781430272045, p. 20 (Year: 2010).*

L. Mattes, L. C. Militelli and J. A. Zuffo, "Platform to enforce multiple access control policy in grid hosting environment," SecureComm 2007, 2007, pp. 199-205, doi: 10.1109/SECCOM.2007.4550332. (Year: 2007).*

A. C. Marosi, P. Kacsuk, G. Fedak and O. Lodygensky, "Sandboxing for Desktop Grids Using Virtualization," 2010 18th Euromicro Conference on Parallel, Distributed and Network-based Processing, 2010, pp. 559-566, doi: 10.1109/PDP.2010.90. (Year: 2010).*

D. Barrera and P. Van Oorschot, "Secure Software Installation on Smartphones," in IEEE Security & Privacy, vol. 9, No. 3, pp. 42-48, May-Jun. 2011, doi: 10.1109/MSP.2010.202. (Year: 2011).*

N. Cook, P. Robinson and S. Shrivastava, "Component middleware to support non-repudiable service interactions," International Conference on Dependable Systems and Networks, 2004, 2004, pp. 605-614, doi: 10.1109/DSN.2004.1311931. (Year: 2004).*

Wanjun Huang, Wei Zhou, Xinhua Zhang and C. Meinel, "A dynamic, secure and multi-solutions supported middleware system," The 7th International Conference on Advanced Communication Technology, 2005, ICACT 2005., 2005, pp. 724-729, doi: 10.1109/ICACT.2005.246054. (Year: 2005).*

G. Cheng et al., "Building dynamic integrity protection for multiple independent authorities in virtualization-based infrastructure," 2009 10th IEEE/ACM International Conference on Grid Computing, 2009, pp. 113-119, doi: 10.1109/GRID.2009.5353079. (Year: 2009).*

E. Freudenthal and Vijay Karamcheti, "DisCo: middleware for securely deploying decomposable services in partly trusted environments," 24th International Conference on Distributed Computing Systems, 2004. Proceedings., Tokyo, Japan, 2004, pp. 494-503, doi: 10.1109/ICDCS.2004.1281616. (Year: 2004).*

T. Lindquist, A. Ramamurthy and R. Anguamea, "Frameworks for Securing Limited-Device Applications," Proceedings of the 41st Annual Hawaii International Conference on System Sciences (HICSS 2008), Waikoloa, HI, USA, 2008, pp. 293-293, doi: 10.1109/HICSS.2008.175. (Year: 2008).*

M. Alam, J. -P. Seifert and X. Zhang, "A Model-Driven Framework for Trusted Computing Based Systems," 11th IEEE International Enterprise Distributed Object Computing Conference (EDOC 2007), Annapolis, MD, USA, 2007, pp. 75-75, doi: 10.1109/EDOC.2007.52. (Year: 2007).*

P. Krishnan, S. Hafner and A. Zeiser, "Applying Security Assurance Techniques to a Mobile Phone Application: An Initial Approach," 2011 IEEE Fourth International Conference on Software Testing, Verification and Validation Workshops, Berlin, Germany, 2011, pp. 545-552, doi: 10.1109/ICSTW.2011.10. (Year: 2011).*

D. Feth and A. Pretschner, "Flexible Data-Driven Security for Android," 2012 IEEE Sixth International Conference on Software Security and Reliability, Gaithersburg, MD, USA, 2012, pp. 41-50, doi: 10.1109/SERE.2012.14. (Year: 2012).*

(56) References Cited

OTHER PUBLICATIONS

Carare, "The impact of bestseller rank on demand: evidence from the app market," International Economic Review, vol. 53, No. 3, 2012, pp. 717-742. JSTOR, http://www.jstor.org/stable/23251494. (Year: 2012).*

Doree, Jim. "RSS: A Brief Introduction," The Journal of manual & manipulative therapy vol. 15,1 (2007): 57-8. doi: 10.1179/106698107791090169, 2007, retrieved from https://www.ncbi.nlm.nih.gov/pmc/articles/PMC2565593/ (Year: 2007).*

* cited by examiner

FIG. 7

| Step | Description | |
|---|---|---|
| 1 | Application created in App Portal | Host creates AppPortal application and assigns to it a unique identifier (ProgID) and "sandbox" configuration — 702 |
| 2 | Application built | Version of application is built, has passed internal vendor's QA, and is ready to be released — 704 |
| 3 | Application published | Vendor's release manager publishes the version of application to the portal. At this moment, the published version of the application isn't yet available to users — 706 |
| 4 | Application approved for release to users | Host reviews and approves or denies the version of the application — 708 |
| 5 | Application released | Version of the application is released to entitled users — 710 |

SYSTEM AND METHOD FOR ELECTRONIC DISTRIBUTION OF SOFTWARE AND DATA

CROSS-REFERENCE TO RELATED APPLICATION

This application is a continuation of prior U.S. patent application Ser. No. 13/570,076, filed Aug. 8, 2012, which claims the benefit of U.S. Provisional Patent Application No. 61/521,192, titled "System and Method for Electronic Distribution of Software and Data" and filed on Aug. 8, 2011, both of which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records but otherwise reserves all copyrights whatsoever.

BACKGROUND OF THE INVENTION

Data providers often provide software, e.g., tools, applications, applets, plug-ins, etc., for analyzing, manipulating, and otherwise using the data (e.g., content, media, etc.) that they provide.

For example, an application portal may provide for electronic distribution of such software and data.

SUMMARY OF THE INVENTION

Embodiments of the invention support distribution of software and data by data and service providers, and other services and organization (e.g., ISPs, software developers, etc., insofar as they provide data in a role other than as a mere conduit for network traffic), which are referred to generally herein as "providers."

Embodiments of the invention are described herein in connection with software and data. "Software" is meant in a broad sense and may include software applications, applets, plug-ins, and other software components. "Software component" is also meant in a broad sense, and may include any unit of software intended to be distributed, installed, and/or used as a unit, and may include, e.g., a standalone application, a plug-in, a library, or other component. "Data" is also meant in a broad sense, and may include digital content and media.

According to some embodiments, software components may be configured to receive data that a provider provides and in some way process, present, and/or store that data. Some embodiments include an application portal, application marketplace, or application store (any of which may hereinafter be referred to as an "application portal") comprising data available for downloading and/or streaming (either of which may hereinafter be referred to as "downloading").

The term "sandbox" is well known in the art and may refer to a protected computing environment in which software components may be executed with limited privileges. Although operating systems are also known to control processes' access to various facilities, a sandbox is not an operating system as such, but typically refers instead to a relatively tightly controlled environment, which may exist within an operating system, and which may impose restrictions on access to resources in addition to the restrictions that are imposed by the operating system that hosts the sandbox. (The more formal term "controlled execution environment" may also be used to refer to a sandbox.)

According to some embodiments, data downloaded from an application portal is used in a sandbox or other controlled and/or protected environment, and in some embodiments, may be used only on authorized devices. In some embodiments, such data may only be accessed through predetermined data sources and/or providers, including those operated by the provider of the application portal and external providers.

According to embodiments, the application portal may be accessible via private or semi-private networks such as LANs, WANs, VPNs, intranets, or extranets; by private electronic communication networks (ECNs); by public networks such as the Internet; or by other communication networks or methods, including via wired and wireless technologies. In various embodiments, the application portal may run on or be accessible from a computer, server, media player, mobile and/or cellular device, tablet, storage device, entertainment device, or other electronic device.

According to some embodiments, data providers provide created or acquired data, and software developers provide created or acquired software components that are uploaded to the application portal for electronic distribution. Such data may include, for example, financial data, news, movies, music, books, and games that are distributed in a variety of formats. Such software components may include tools, applications and plug-ins for analyzing or manipulating data, or presenting or playing data. In one embodiment, the data available for download from the application portal includes data drawn from or otherwise relevant to the fields of financial services, investments, and trading, and the software components display, chart, and/or analyze financial data, instruments and/or products, or execute or make easier the trading of financial instruments.

According to some embodiments, a data provider operates the application portal. In other embodiments, another service or organization, unrelated to a data provider, operates the application portal.

According to some embodiments, the application portal is operated by one party and at least one other party provides software components and/or data. According to some embodiments, the portal operator contractually binds third-party software component developers and/or third party data providers to comply with certain policies, e.g., terms of service, set forth by the operator of the application portal. According to some embodiments, third-party software component developers and data providers may be individuals or organizations.

According to some embodiments, software component developers and data providers may use a software development kit ("SDK") developed and maintained by the operator of the application portal. Such an SDK may be based on, or leverage the power of, an existing development environment, framework, and/or runtime environment, e.g., Microsoft Visual Studio and .NET technologies.

In an embodiment, the application portal SDK may include or otherwise be associated with tools that allow the application portal operator to handle version control and deployment of software components and data on the application portal. The application portal SDK may also allow the software components to access other data or software stored on or offered by the application portal operator, either with or without a subscription requirement.

For example, in one embodiment, a financial services software component developed using the application portal SDK may be configured to access data about financial instruments, where the data is offered by the operator of the application portal. This provides for controlled integration of a third-party software component into the data provider/portal operator's sandbox to access and use data supplied by the data provider. For example, a stock charting software component developed by a third party may access historical stock information and charting functions provided by a data provider and portal operator such as Bloomberg Finance L.P. ("Bloomberg"). Such integration between a third-party software component and underlying data from the application portal operator creates a synergistic effect.

According to some embodiments, software components distributed from the application portal that are configured to access other data may be required, by technical restrictions, contractual obligation, or both, to access such data through the services of the application portal operator and to use data delivered by the operator of the application portal if such data is available through the application portal or from the application portal operator.

For example, in one embodiment, a stock charting software component developed by a third party may access historical stock information and charting functions provided by a data provider such as Bloomberg, where Bloomberg is also the operator of the application portal, but would be prohibited from accessing historical stock information and charting functions from a different data provider. Such a model would integrate the software component on the application portal with other services offered by the operator of the application portal and, in an embodiment, may support various subscription and revenue models, as discussed in more detail below.

According to some embodiments, software components distributed from the application portal that are configured to access data from the application portal operator or a third-party data provider may receive triggers or alerts from the data providers, and may update the data used by software component accordingly. For example, a stock charting software component developed for an application portal by a third party may access historical stock information and charting functions provided by the application portal operator such as Bloomberg, with the application portal operator alerting the third-party stock charting software component of changes in data, e.g., upon receipt of a press release, execution of a stock trade, or some other notable event.

According to some embodiments, software components available on the application portal may be configured to be downloadable, accessible, or executable only on certain devices. For example, in an embodiment, a stock charting software component developed by a third-party may be configured to run on an authorized desktop or mobile device accessing the Bloomberg Professional® Service ("BPS"), only within the BPS sandbox and only on one or more authorized devices.

According to some embodiments, software components available on the application portal may be configured to be downloadable, accessible, or executable only by certain individuals, groups, or users meeting certain criteria, in either moderated or non-moderated application portals. For example, in an embodiment, a stock charting software component developed by a third-party investment bank may be configured to run only on devices registered to employees of that investment bank. In addition to or instead of the foregoing, permissioning to access data available to the bank may be configured at various access levels. For example, whether or not a particular user is allowed to download and/or execute a software component that uses certain data can depend upon whether that user has been separately permissioned to use that data with that software component. Administratively, however, some or all such separate permissions may in an embodiment of the invention be commonly administered, e.g., with reference to a single user account or group of accounts.

According to some embodiments, software components available on the application portal may be configured to receive "roaming" information from the application portal or other source to allow a user to utilize different devices/terminals and retain a common user profile, settings, etc. with respect to the devices, terminals, and software components.

According to some embodiments, software components may execute in a sandboxed run-time environment on user devices to allow unknown third-party software to safely run on user devices. Such an environment may prevent the software components from accessing functions or information otherwise accessible on the device but outside the intended reach of the sandbox. For example, the sandbox environment may prevent access to certain operating system, local file system, registry, and memory resources. In such an embodiment, the application portal operator may promote this safeguard to potential users, who can be assured that software components provided by the application portal can safely run on the users' devices, including devices which are used to support mission-critical operations and decisions.

As another safeguard, in an embodiment, software developers and data providers may undergo a vetting process by the operator of the application portal. For example, in an embodiment, the operator of the application portal may conduct a background review of the developer/data provider; require that the business interests or goals of the developer/data provider comport with the interests and goals of the application portal operator; require that the developer/data provider comply with technical and data usage rules and terms of service; require that the software component be capable of running in a sandbox environment; and/or require that any external data served by the software component be served by the application portal operator, and not from a third-party server or other data source.

Alternatively, the operator may require that external data be served by the application portal operator only if that data is available from that operator, allowing access to data from a third-party server otherwise. Even when access to data from a third-party server is allowed, however, the application portal operator may act as a proxy between the third-party server and a software component that requests the data.

According to some embodiments, after developers and data providers have created software components and uploaded the software components to the application portal for electronic distribution, users of the software component may download the data for a pre-determined fee. In an embodiment, the fee may be a one-time charge, or may be a recurring charge based on a subscription model. Any such fee may be subsumed in another charge not specifically associated with the component or its use of data, such as, e.g., a general subscription or other fee charged by a data provider for use of its data.

In an embodiment, the application portal operator may collect the fees directly from the purchaser, and may then share the fees with the developer/data provider, e.g., according to a previously agreed formula. For example, it may be agreed that 70% of the revenue derived from sales of a software component may be passed along to the developer/data provider and the operator may retain 30%. Any formula for dividing revenue may be adaptive, based, e.g., on the sales volume of the developer/data provider. In addition to or instead of the foregoing, such a formula may vary based on whether the software component accesses data delivered by the operator of the application portal.

In an embodiment, the application portal operator may allow one or more software components to access data on the application portal at no charge, e.g., to stimulate sales of the software components.

According to embodiments, the developer/data provider may be required to meet one or more standards to remain a developer/data provider on the application portal. For example, an operator may impose a monthly or yearly revenue or quantity minimum to remain a developer/data provider. The developer/data provider may also be required to lease from the application portal operator, or have access to, test devices compatible with the application portal, which may include proprietary user devices. In an embodiment, the developer/data provider may be required to comply with service level agreements ("SLAs") to ensure that the developer/data provider will timely fix high-priority software bugs identified by users.

In an embodiment, the developer/data provider may be allowed to use a proprietary front-end or user interface for a software component, but may be required to adhere to workflow or design standard guidelines set forth by the application portal operator.

According to embodiments, the application portal operator may be responsible for the deployment and version control of software components as well as billing administration, technical support, and serving as the first point of contact for users.

According to embodiments, the presence of a software component on the application portal may be advantageous to the developer/data provider, as the application portal may have a wide audience or established user base. In an embodiment, the application portal operator may choose to feature the software component of a particular developer/data provider to increase sales.

According to some embodiments, systems for carrying out the functionality and or methods disclosed herein comprise at least one computer which receives, stores, and/or transmits data provided by developers and data providers, and receives, stores, and/or transmits other data, e.g., data provided by the application portal operator. The at least one computer comprises or has access to electronic storage to store data described herein and access to code to cause the at least one computer to perform the functionality described herein.

In an embodiment, devices that may access the application portal may comprise at least one computer or computing device, appropriate data and code storage, and input and output devices, e.g., a keyboard, a pointing device, a scanner, a computer monitor, a printer, communication devices, etc., or may comprise a media player, mobile and/or cellular device, tablet, storage device, entertainment device, or other electronic device.

According to an embodiment of the invention, a method is provided of electronically distributing computer software, by a distributor, in a networked computing environment. The method comprises: electronically transmitting through a computer network computer software that comprises a controlled execution environment, the controlled execution environment being capable of controlling use of the computer network by one or more components that execute within the controlled execution environment; configuring the controlled execution environment so that a component executing within the controlled execution environment is restricted to communication via the computer network only to one or more network hosts specified by the distributor; and electronically transmitting through the computer network computer software that comprises a component, the component being configured to be capable of execution only within the controlled execution environment.

According to an embodiment of the invention, a method is provided of electronically distributing computer software to a purchaser, by a provider of electronic data, in a networked computing environment. The method comprises: electronically transmitting through a computer network computer software that comprises a controlled execution environment, the controlled execution environment being capable of controlling use of the computer network by one or more components that execute within the controlled execution environment; configuring the controlled execution environment so that any component executing within the controlled execution environment is restricted to communication via the computer network only to one or more network hosts specified by the provider of electronic data; receiving from an entity that is independent of the provider of electronic data, a component, the component being configured to be capable of execution only within the controlled execution environment; electronically receiving from the purchaser one or more queries via the computer network comprising purchase of, or a subscription to, the component in exchange for one or more first payments; and in response to receipt of the one or more queries, electronically transmitting to the purchaser through the computer network the component. In an embodiment of the invention, the method comprises receiving from the purchaser one or more second payments in exchange for electronic data services and paying the independent entity an amount that is based on the one or more first payments but is not based on the one or more second payments.

According to an embodiment, configuring the controlled execution environment comprises individually restricting one or more specified components executing within the controlled execution environment to communication only to one or more respective specified network hosts. According to an alternative embodiment, configuring the controlled execution environment comprises collectively restricting one or more components executing within the controlled execution environment to communication only to one or more specified network hosts. According to an alternative embodiment, configuring the controlled execution environment comprises restricting one or more components executing within the controlled execution environment from accessing one or more resources of a client device.

According to an embodiment, the specified network hosts are controlled by the distributor.

A method according to an embodiment comprises electronically receiving one or more queries from the computer network, wherein electronically transmitting the software that comprises the component takes place automatically in response to receipt of the one or more queries. According to an embodiment, the one or more queries comprise a purchase of, or subscription to, the component or the software that comprises the component in exchange for one or more first payments. According to an embodiment, prior to receiving the one or more queries, receiving the software from an entity that is independent of the distributor. According to an embodiment, the specified network hosts are controlled by the distributor.

According to an embodiment, the distributor is a provider of electronic data services and the purchase or subscription is made by a purchaser, comprising receipt from the purchaser of one or more second payments in exchange for the electronic data services. According to an embodiment, payment by the distributor to the independent entity is of an amount based on the one or more first payments. In an embodiment, the distributor does not make any payment to the independent entity based on the one or more second payments.

Embodiments of the invention include computer systems configured and/or otherwise programmed to carry out the above methods. Embodiments also include computer readable storage media encoded with instructions that, when executed by one or more processors within a computer system, cause the computer system to carry out the above methods.

BRIEF DESCRIPTION OF THE DRAWINGS

The invention is illustrated in the figures of the accompanying drawings, which are meant to be exemplary and not limiting, and in which like references are intended to refer to like or corresponding parts, elements, or functions.

FIG. 7 illustrates an embodiment of the release process of an application onto the application portal.

DETAILED DESCRIPTION OF PREFERRED EMBODIMENTS

Embodiments of the invention may be implemented by systems using one or more programmable digital computers.

Figure 1:
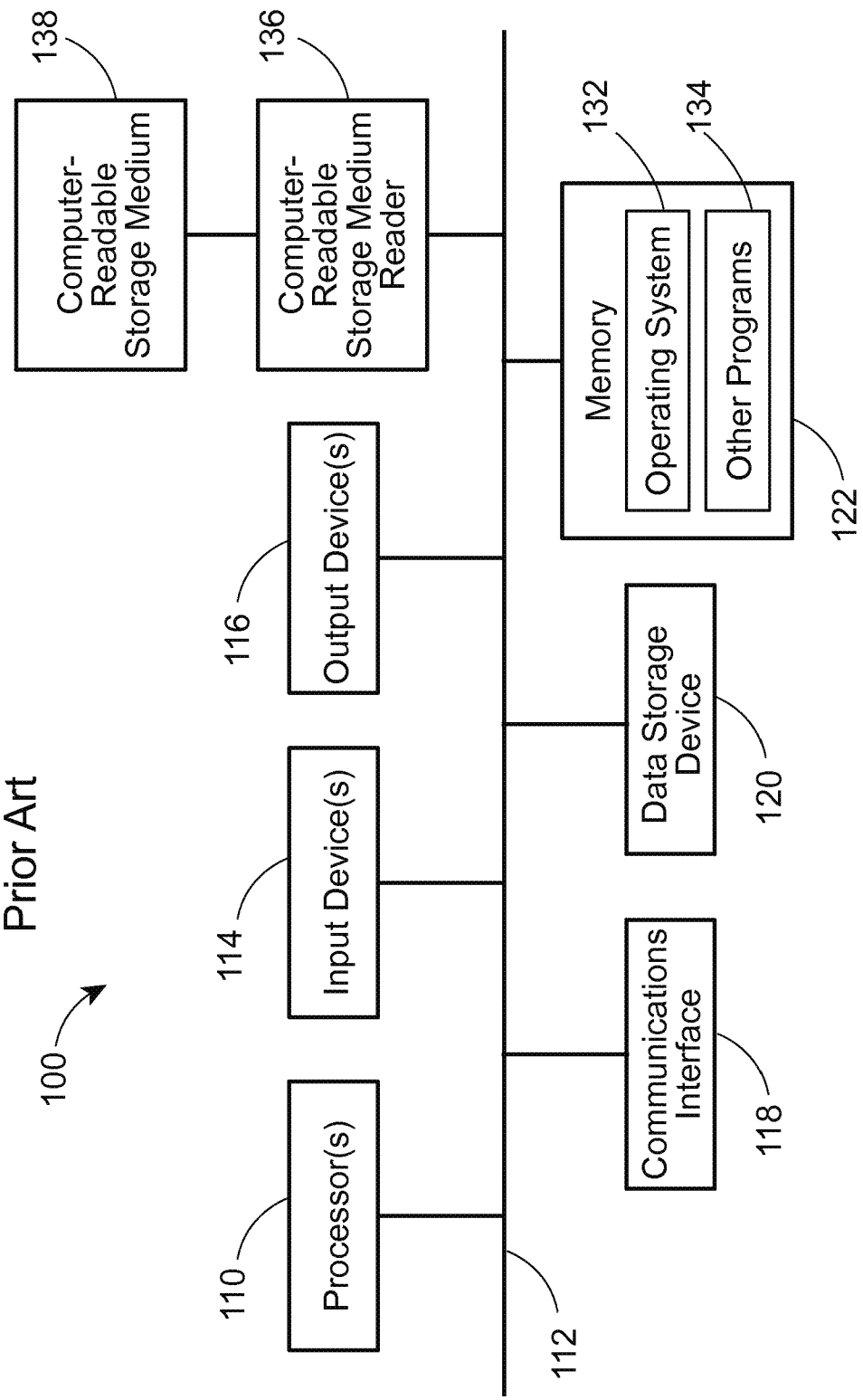
FIG. 1 illustrates a computer system according to one embodiment of this invention.

FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 1 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 1) and/or memory 122 may store instructions executable by one or more processors or kinds of processors 110, data, or both. Some groups of instructions, possibly grouped with data, may make up one or more programs, which may include an operating system 132 such as Windows 7, Microsoft Windows XP® or Vista™, Linux®, Mac OS®, or Unix®. Other programs 134 may be stored instead of or in addition to the operating system. It will be appreciated that a computer system may also be implemented on platforms and operating systems other than those mentioned. Any operating system 132 or other program 134, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 1) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash RAM. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CSRM 138.

Figure 2:
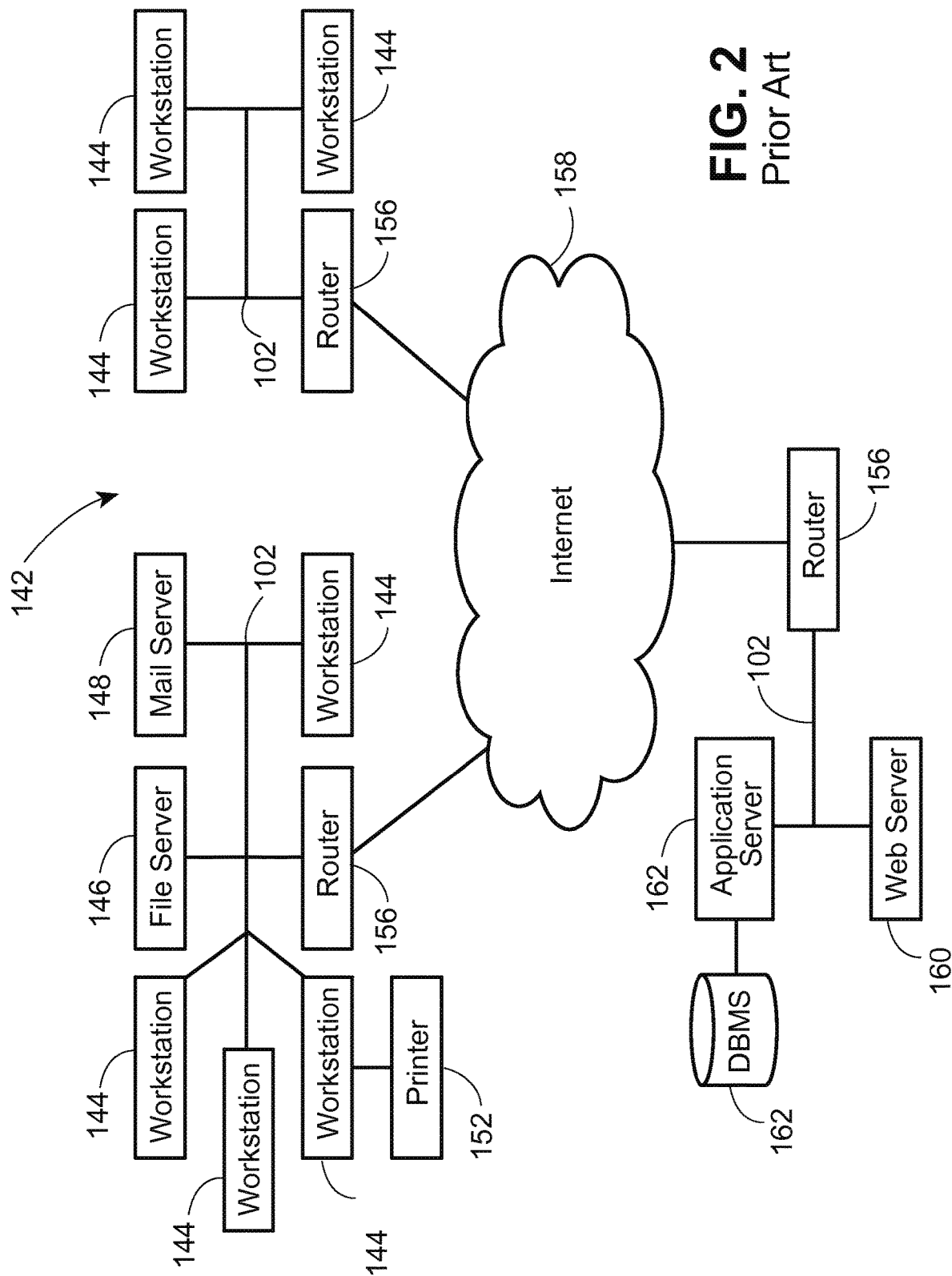
FIG. 2 illustrates a computer network according to one embodiment of this invention.

Two or more computer systems 100 (FIG. 1) may communicate, e.g., in one or more networks, via, e.g., their respective communications interfaces 118 and/or network interfaces (not depicted). FIG. 2 is a block diagram depicting an example of one such interconnected network 142. Network 142 may, for example, connect one or more workstations 144 with each other and with other computer systems, such as file servers 146 or mail servers 148. A workstation 144 may comprise a computer system 100. The connection may be achieved tangibly, e.g., via Ethernet® or optical cables, or wirelessly, e.g., through use of modulated microwave signals according to the IEEE 802.11 family of standards. A computer workstation 144 or system 100 that participates in the network may send data to another computer workstation system in the network via the network connection. A user station or trader station or client station may be embodied by computer workstation 144 or other suitable equipment known in the art.

One use of a network 142 (FIG. 2) is to enable a computer system to provide services to other computer systems, consume services provided by other computer systems, or both. For example, a file server 146 may provide common storage of files for one or more of the workstations 144 on a network 142. A workstation 144 sends data including a request for a file to the file server 146 via the network 142 and the file server 146 may respond by sending the data from the file back to the requesting workstation 144.

Further, a computer system may simultaneously act as a workstation, a server, and/or a client. For example, as depicted in FIG. 2, a workstation 144 is connected to a printer 152. That workstation 144 may allow users of other workstations on the network 142 to use the printer 152, thereby acting as a print server. At the same time, however, a user may be working at the workstation 144 on a document that is stored on the file server 146.

The network 142 (FIG. 2) may be connected to one or more other networks, e.g., via a router 156. A router 156 may also act as a firewall, monitoring and/or restricting the flow of data to and/or from the network 142 as configured to protect the network. A firewall may alternatively be a separate device (not pictured) from the router 156.

An internet may comprise a network of networks 142 (FIG. 2). The term "the Internet" refers to the worldwide network of interconnected, packet-switched data networks that use the Internet Protocol (IP) to route and transfer data. For example, a client and server on different networks may communicate via the Internet 158, e.g., a workstation 144 may request a World Wide Web document from a Web Server 160. The Web Server 160 may process the request and pass it to, e.g., an Application Server 162. The Application Server 162 may then conduct further processing, which may include, for example, sending data to and/or receiving data from one or more other data sources. Such a data source may include, e.g., other servers on the same computer system 100 or LAN 102, or a different computer system or LAN and/or a Database Management System ("DBMS") 162.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

The terms "client" and "server" may describe programs and running processes instead of or in addition to their application to computer systems described above. Generally, a (software) client may consume information and/or computational services provided by a (software) server.

Figure 3:
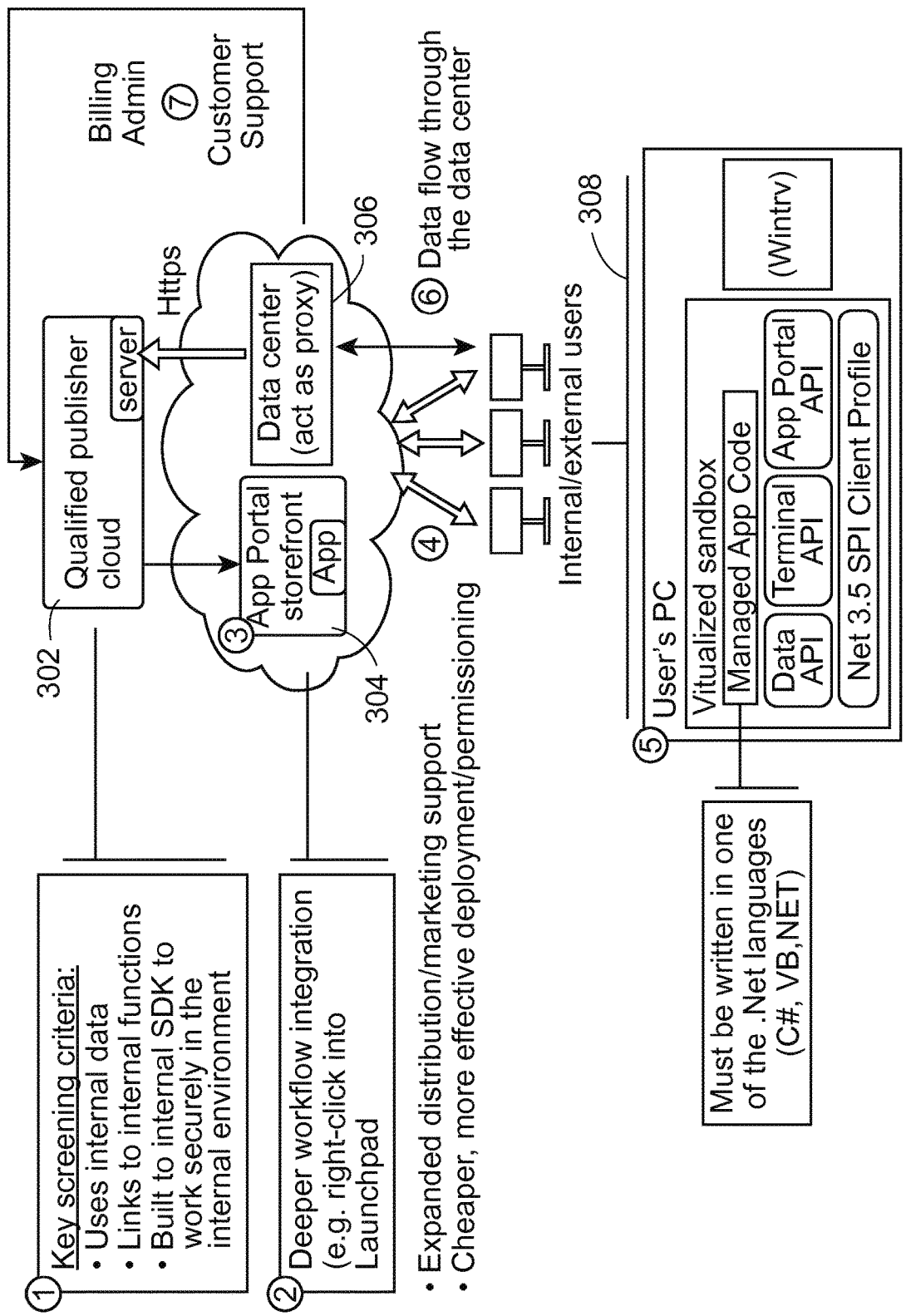
FIG. 3 illustrates an embodiment of an electronic delivery platform comprising a developer/data provider data source, an application portal, an application portal operator data source/data center, and user devices.

FIG. 3 illustrates an embodiment of an electronic delivery platform comprising a data provider data source 302, an application portal 304, a data source/data center 306 operated by the application portal operator, and user devices 308.

In an embodiment, developers and data providers create software components and/or digital content that may be considered to exist in a developer "cloud" 302, from which they may be uploaded to the application portal 304. The application portal 304 may receive the software component and/or content from developers and data providers that have been vetted by the application portal operator.

According to some embodiments, the application portal 304 or the data center 306 may transmit the software component provided by the developer and the content provided by the data provider to one or more user devices 308, which may be a computer, server, media player, mobile and/or cellular device, tablet, storage device, entertainment device, or other electronic device. According to some embodiments, the software component may run in a sandboxed run-time environment on user devices 308 to allow third-party digital data to safely run on such devices.

In an embodiment, the application portal 304 may be based on the Microsoft .NET Framework, with software components written in one of the .NET languages, e.g., C# or VB.NET. The sandbox of the .NET framework may provide runtime security by preventing software component code from interacting with the local file system, registry, or any other unnecessary local computer resources.

In an embodiment, for example, the secure sandbox environment restricts application access to critical desktop resources such as the registry, file system, network, and unmanaged code, e.g., DLLs and COM servers. Under no circumstances, in one embodiment, will a software component running in the sandbox have the ability to launch any processes. According to some embodiments, sandbox protection is enforced using .NET Code Access Security policies.

Figure 12:
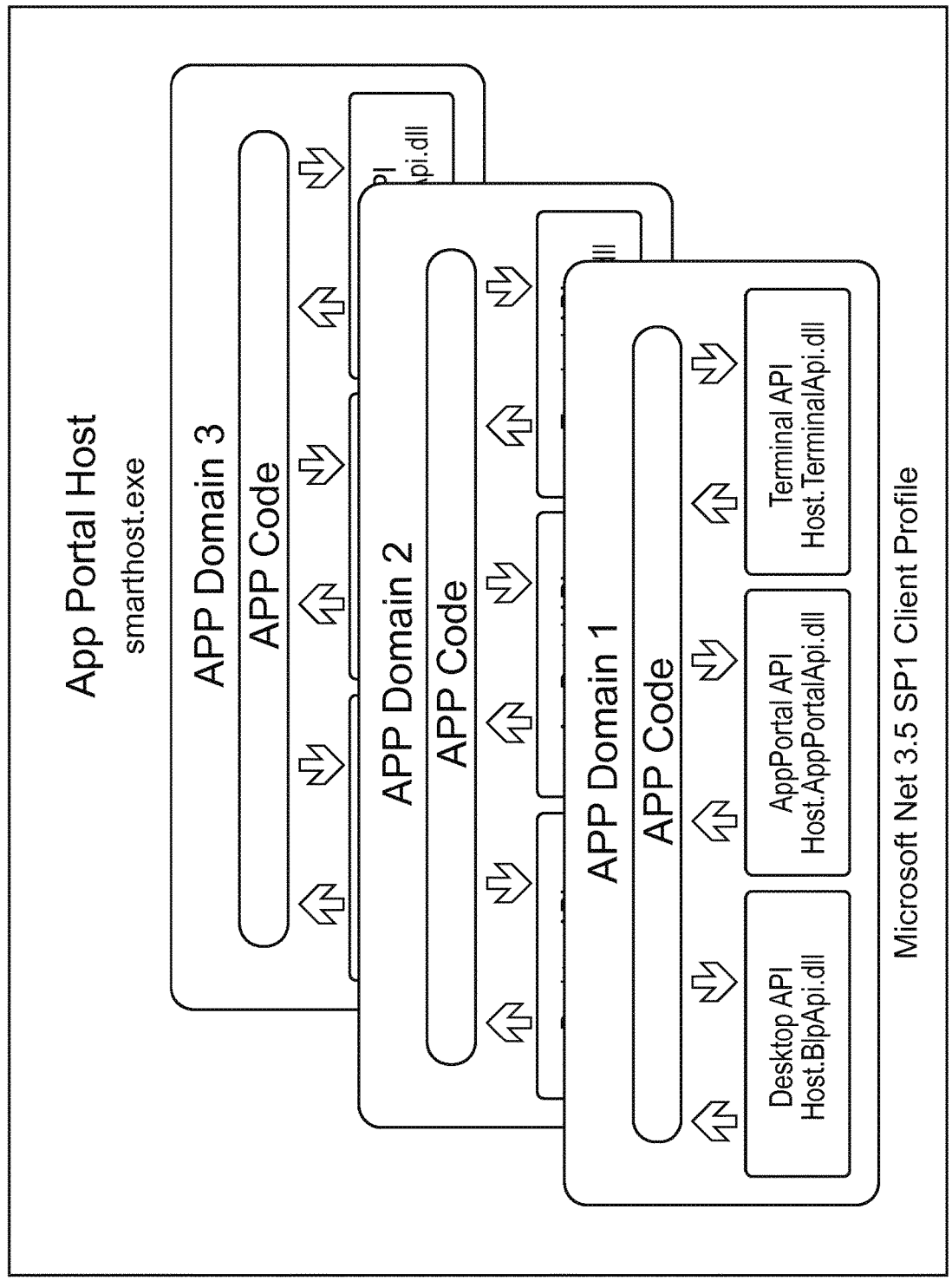
FIG. 12 illustrates an embodiment of three .NET Application Domain sandboxes as utilized on the application portal.

In an embodiment, each instance of a software component executes in its own .NET Application Domain sandbox within a hosting process, as shown in FIG. 12. In addition to providing a secure hosting environment, the sandbox also improves overall system reliability. For example, if an individual software component encounters an unexpected error, the application portal hosting process may terminate the component, without affecting other software components.

In an embodiment, the application portal 304 may rely on a private virtualized distribution of the .NET Framework Client Profile, so that a local installation is not required. According to some embodiments, when a user associated with a given user device 308 purchases a software component or data from the application portal 304, the software component or content is delivered to the user device 308 and executed in the separate .NET AppDomain.

In an embodiment, the application portal 304 will also monitor installed versions of software components and content, and will automatically download a new version of the software component or content when it becomes available, e.g., when a new version with bug fixes, new functionality, or updated content is released by the developer or data provider. In an embodiment of the invention, the application portal 304 may support redownload and/or repair of damaged software components and content.

According to some embodiments, application portal 304 may be configured to allow software components and content to only be downloadable, accessible, or executable on certain devices, or by certain individuals, groups, or users meeting certain criteria.

According to some embodiments, application portal 304 may have moderated or non-moderated features and/or controls. In a moderated environment, in an embodiment, a "manager" or other party at a customer entity can control the one or more individuals or parties at the entity that may purchase and/or receive updates to software components. For example, a manager at a given entity may permit only a particular set of individuals in Research & Development at the manager's entity to receive updates to software components, whereas the remaining individuals at the manager's entity do not receive such updates. Similarly, a manger at an entity may permit only a particular group of individuals to purchase software components while restricting all others at the manager's entity from making app portal purchases. In a non-moderated environment, in an embodiment, once a given entity is enabled, there are minimal or no restrictions placed on individuals at the entity from purchasing and/or receiving updates to software components on the application portal.

In an embodiment, software components may be supplemented by data from data center 306, which may be operated by the operator of the application portal 304. In another embodiment, software components may be supplemented by data from data source 302 supplied by the developer/data provider or a third-party data source, using the application portal operator's data center 306 as a proxy. According to some embodiments, software components configured to be supplemented by data from data source 306 may receive triggers or alerts from data source 306, and update the software component or content accordingly.

Figure 4:
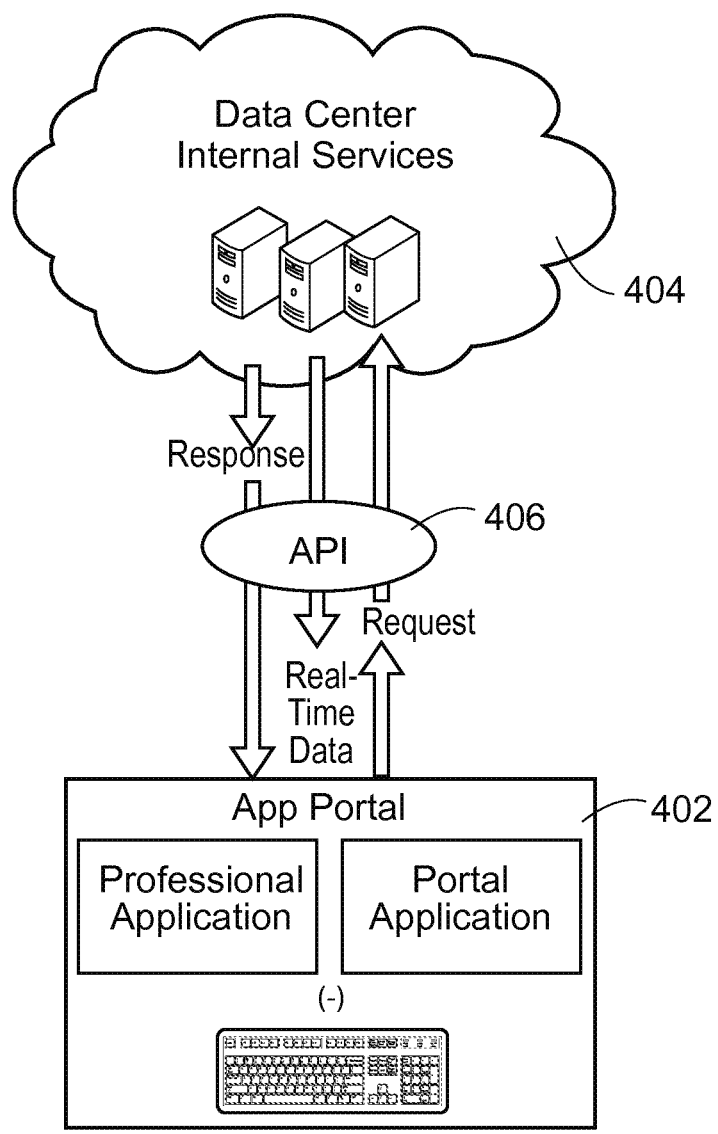
FIG. 4 illustrates an embodiment of an application on the application portal consuming data from a data center operated by the application portal operator.

FIG. 4 illustrates an embodiment of an software component on the application portal 402 consuming data from a data center 404 operated by the application portal operator, e.g., data center 306 shown in FIG. 3, through a software component programming interface ("API") 406. API 406 operates as an interface between application portal 402 and data center 404, and may negate the need for application portal 402 and data center 404 to be configured to directly communicate. API 406 may also allow software components and data available on the application portal 402 to access other services and data provided by the application portal operator at data center 404, e.g., fetching information on financial instruments, launching a trade ticket populated with information from the software component, providing "roaming" information to allow a user to utilize different terminals and retain a common user profile and settings, etc.

Figure 5:
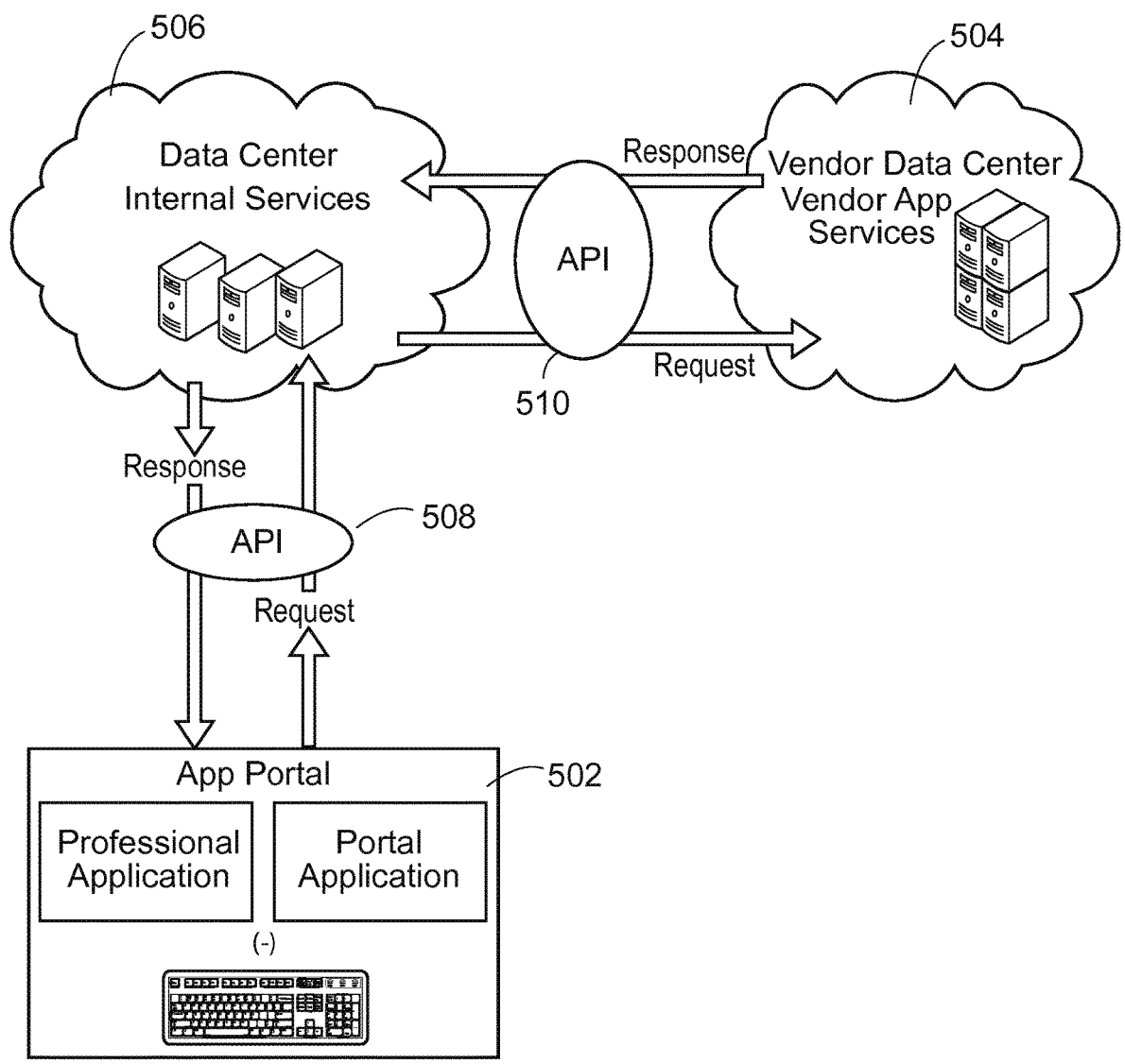
FIG. 5 illustrates an embodiment of a software component on the application portal consuming data from a data center operated by the developer/data provider or other third-party data source, via the data center operated by the application portal operator.

FIG. 5 illustrates an embodiment of a software component on the application portal 402 consuming data from a data center 504 operated by the developer or other third-party data source, via the data center 506 operated by the application portal operator, and serving as a proxy. API 508 operates as an interface between application portal 502 and data center 506, and may negate the need for application portal 502 and data center 506 to be configured to directly communicate. API 510 operates as an interface between data center 506 and data center 504, and may negate the need for data center 506 and data center 504 to be configured to directly communicate. Such a configuration may be especially advantageous as, in an embodiment, data center 506 is operated by the application portal and data center 504 is operated by a developer or other third-party data source, i.e., data center 504 and data center 506 may not be configured to directly communicate, and can therefore rely on API 510.

Figure 6:
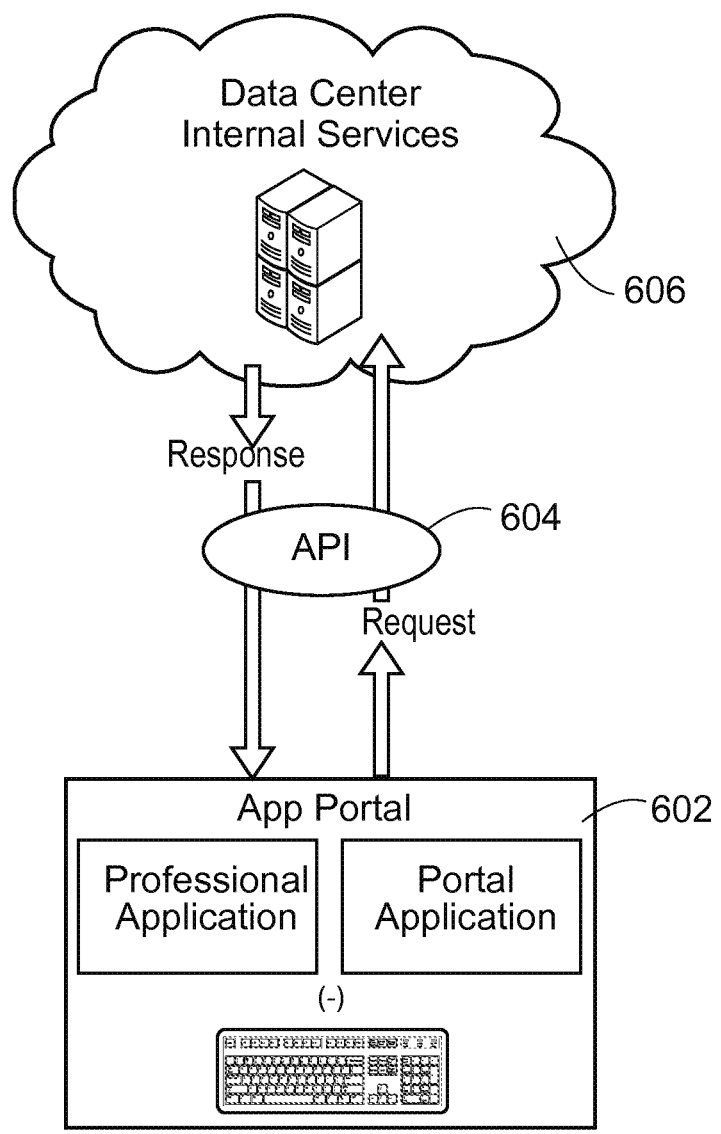
FIG. 6 illustrates an embodiment of a software component on the application portal consuming data from the developer/data provider or other third-party data source, with such data hosted within the data center operated by the application portal operator.

FIG. 6 illustrates an embodiment of a software component on the application portal 602 consuming data from a third-party data source 606, with such third-party data hosted within the data center 606 operated by the application portal operator. API 604 operates as an interface between application portal 602 and data center 606, and may negate the need for application portal 602 and data center 606 to be configured to directly communicate.

FIG. 7 illustrates an embodiment of the release process of a software component onto the application portal. In an embodiment, in step 1 (702), a software component is created on application portal 304 and assigned a unique identifier by the application portal provider. In step 2 (704), the software component is built and uploaded by the developer, passed through quality assurance checks, and prepared for release.

In an embodiment, in step 3 (706), the application portal operator publishes the software component for release, pending review of the software component by the application portal operator in step 4 (708). In step 5 (710), the software component is released to entitled users.

Figure 8:
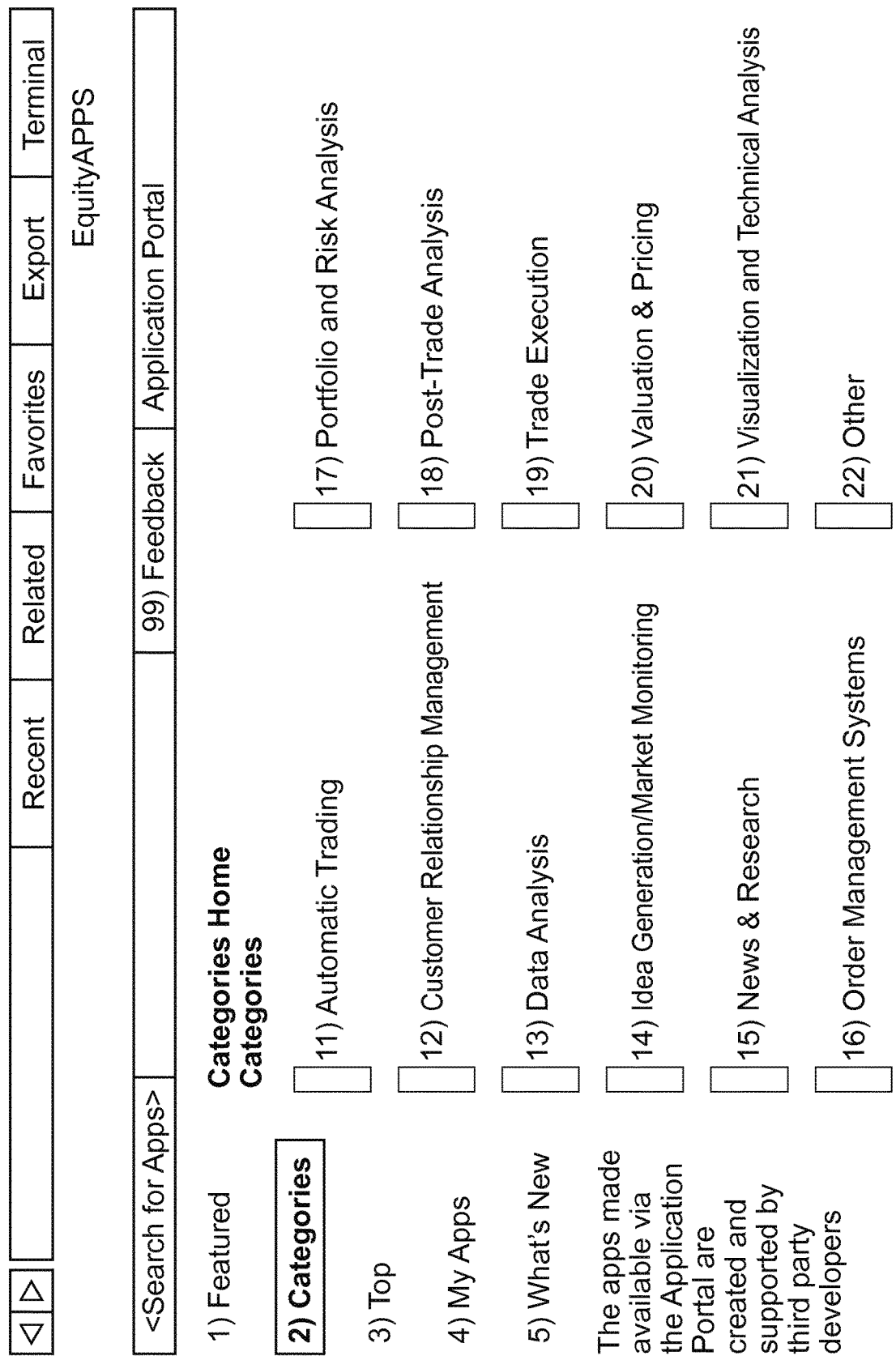
FIG. 8 illustrates a screen which may used to display categories of software components, or data, available on the application portal.

FIG. 8 illustrates a screen that may used to display categories of software components, or data, available on the application portal. In an embodiment, the screen displays a right-hand pane comprising such categories, e.g., Automatic Trading, Customer Relationship Management, Data Analysis, etc., which are individually selectable. Selecting from any of the categories may lead to a screen (not shown) which displays the relevant software components within each category, each of which is individually selectable.

Figure 9:
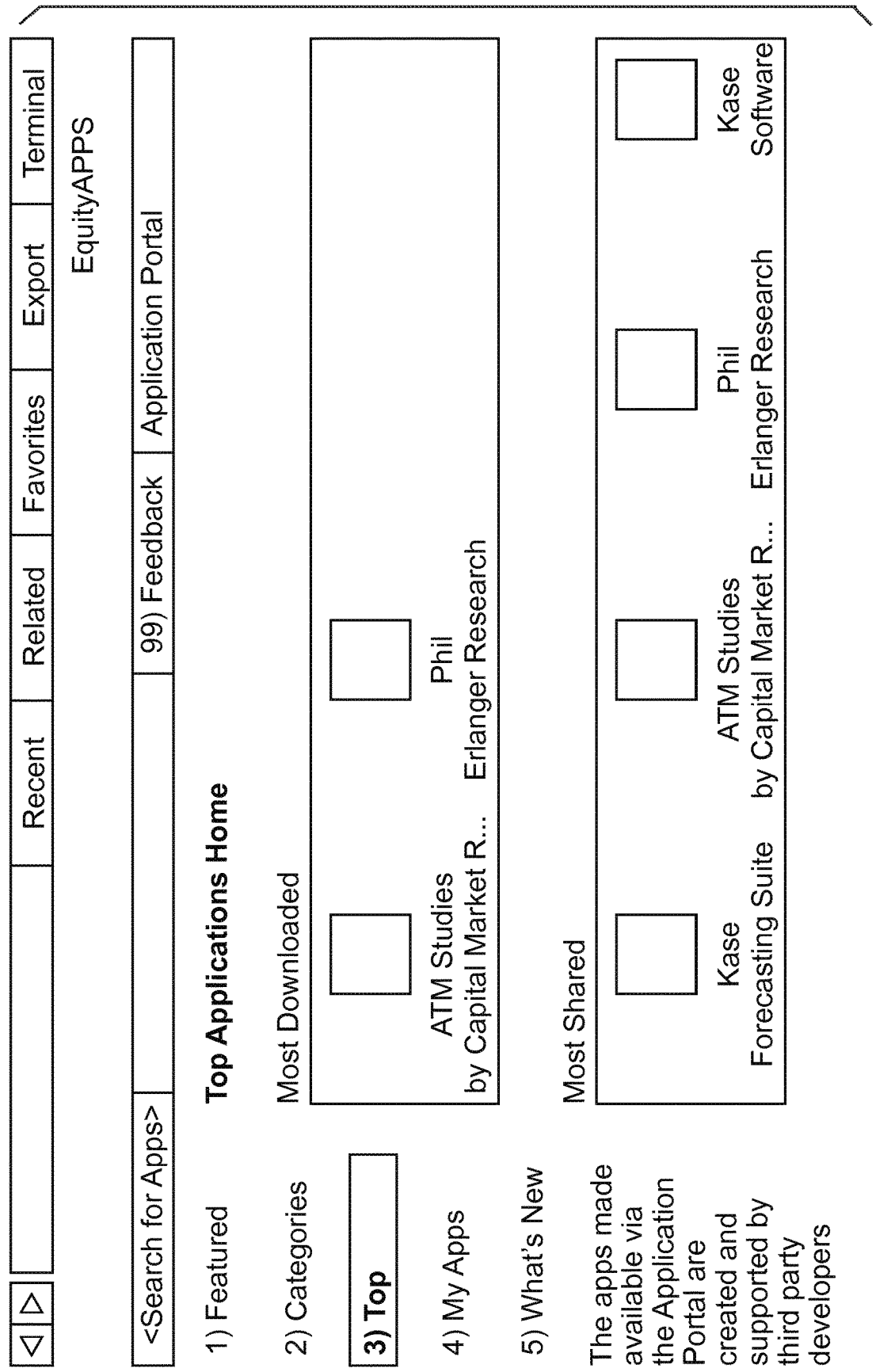
FIG. 9 illustrates a screen which may used to display the top, most-downloaded, and/or most-shared software components, or data, currently available on the application portal.

FIG. 9 illustrates a screen that may used to display the top, most-downloaded, and/or most-shared software components, or content, currently available on the application portal. In an embodiment, the screen displays a right-hand pane comprising such categories, e.g., Most Downloaded and Most Shared, which are individually selectable. Such categories may be dynamically updated at preset intervals based on current activity on the application portal.

Figure 10:
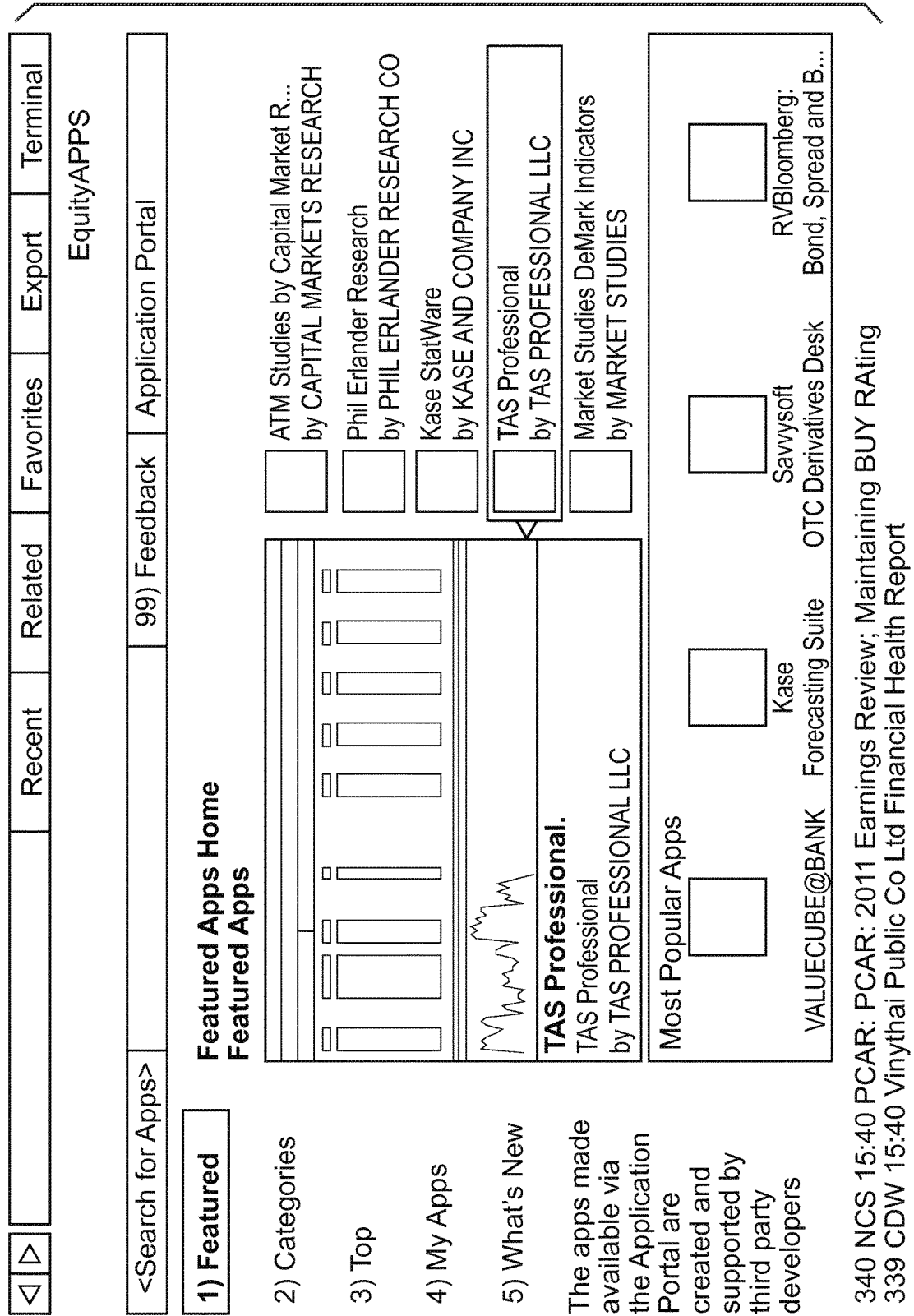
FIG. 10 illustrates a screen which may used to display featured or most popular software components, or data, available on the application portal.

FIG. 10 illustrates a screen that may used to display featured or most popular software components, or content, available on the application portal. Featured software components on this screen may be static and chosen by a review team, or may be dynamically updated based on other criteria such as the amount of time a software component has spent on a most downloaded list. Featured software components on this screen may also be displayed with graphical previews of the software component.

Figure 11:
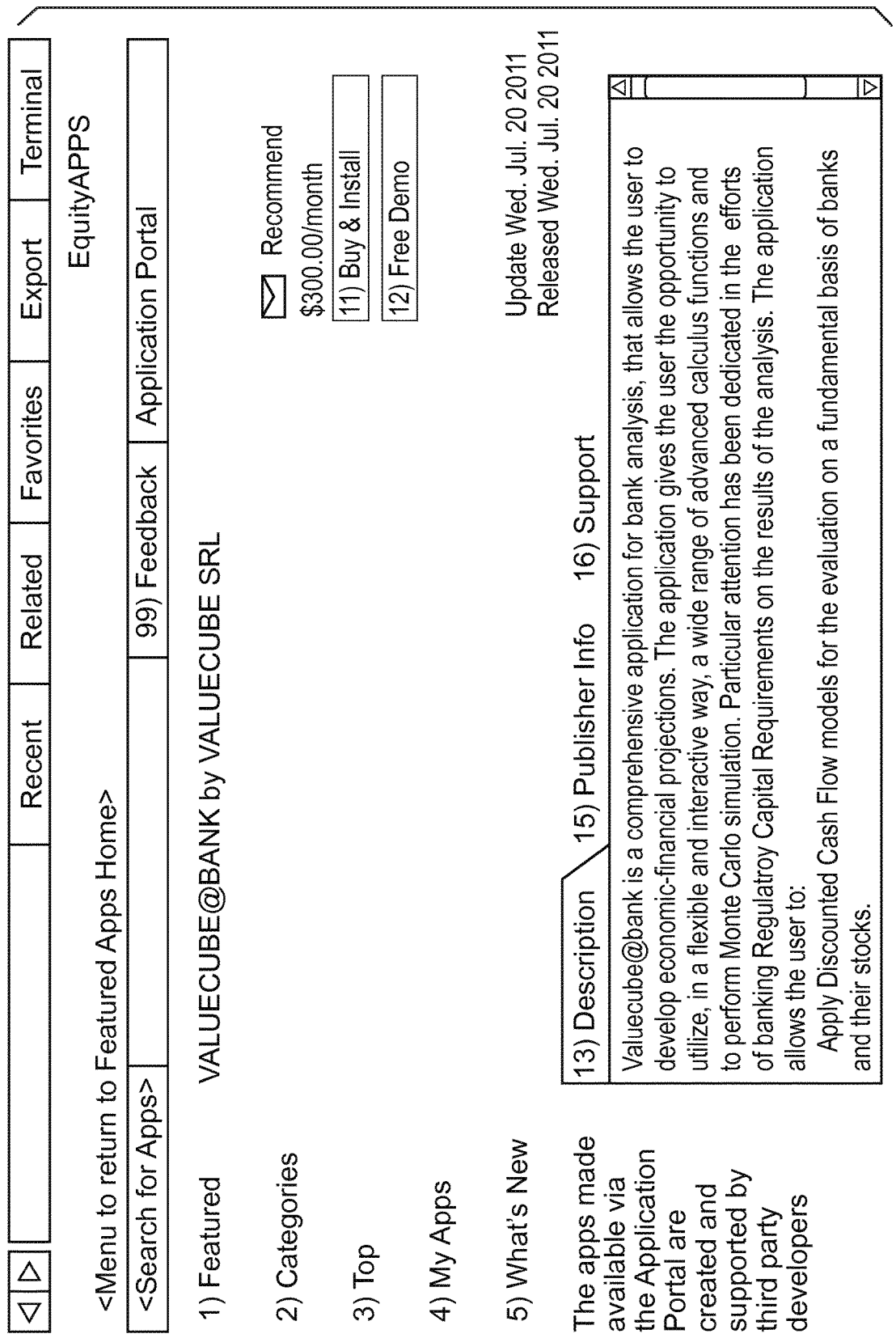
FIG. 11 illustrates a screen which may used to display data about a particular software component, or data, available on the application portal.

FIG. 11 illustrates a detail screen that may used to display data about a particular software component, or content, available on the application portal. The screen of FIG. 11 may be accessible by searching for a particular software component or content by name or keyword using a built-in search feature; by finding the software component or content from within one of the categories discussed above and as displayed on the left-hand pane of FIGS. 8-11; by direct-linking to the software component or content screen via, for example, a URL; or by any other means for locating an software component on the application portal.

In an embodiment, the screen of FIG. 11 displays information about the selected software component including a description, data provider information, support information, release and update dates, and price. According to embodiments, the screen may also allow the user to buy and install the software component or run a free demonstration of the software component, e.g., a one-time trial run of the software component, or a trial run of the software component for a pre-determined time period.

While the invention has been described and illustrated in connection with certain embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention as may be defined by claims.

The invention claimed is:

1. A method for operating an electronic delivery platform for distributing a plurality of software components to a user device, the method comprising:
   receiving the plurality of software components via a computer network from one or more authorized software developers, each software component of the plurality of software components configured to execute only in a controlled execution environment;
   receiving a request, from the user device, for access to a particular one software component of the plurality of software components;
   transmitting the particular one software component, from an application portal, to the user device for execution in the controlled execution environment, wherein the application portal is configured to monitor the particular one software component at the user device and configured to automatically download to the user device a new version of the particular one software component in response to a release of the new version;
   receiving a request from the particular one software component for data from a specified data provider;
   in response to receiving the request for the data from the specified data provider, determining that the particular one software component may access the data from the specified data provider if the specified data provider is operated by a party that operates the electronic delivery platform; and
   in response to determining that the particular one software component may access the data from the specified data provider, transmitting the data to the particular one software component executing on the user device, wherein the particular one software component uses the transmitted data.

2. The method of claim 1, further comprising:
   receiving one or more queries for a purchase of or a subscription to the particular one software component.

3. The method of claim 1, further comprising:
   distributing the data from a data center.

4. The method of claim 3 wherein the data center is a network proxy between the particular one software component executing in the controlled execution environment and the specified data provider.

5. The method of claim 3 wherein the application portal is operated by a party that is different than the one or more authorized software developers.

6. The method of claim 1, further comprising:
   identifying, by an operator of the application portal, the one or more authorized software developers.

7. The method of claim 6 wherein the operator of the application portal is different than the one or more authorized software developers.

8. The method of claim 1, wherein the application portal is configured to output to a display.

9. The method of claim 8, wherein the display is configured to display categories of the plurality of software components available on the application portal.

10. The method of claim 9, wherein the display is configured to display the categories of the plurality of software components in a right-hand pane, wherein the categories of the plurality of software components comprise automatic trading, customer relationship management, and data analysis, which are individually selectable, wherein upon selection of a category of the categories of the plurality of software components, the method further comprises displaying relevant software components, wherein the relevant software components are each individually selectable.

11. The method of claim 9, wherein the display is configured to dynamically update featured software components of the plurality of software components based on an amount of time a software component of the plurality of software components has spent on a most downloaded list.

12. The method of claim 8, wherein the method further comprises displaying information about the particular one software component, and wherein the information comprises update dates of the particular one software component.

13. The method of claim 8, wherein the method further comprises allowing the user to run a free demonstration of the software component as a one-time trial run or a trial run for a pre-determined time period.

14. An electronic delivery platform for distributing a plurality of software components to a user device, the electronic delivery platform comprising:
   an application portal comprising a processor, for executing computer program instructions stored in a memory, which when executed by the processor, cause the processor to perform operations comprising:
      receiving the plurality of software components via a computer network from one or more authorized software developers, each software component of the plurality of software components configured to execute only in a controlled execution environment;
      storing the plurality of software components from one or more authorized software developers;
      receiving a request, from the user device, for access to a particular one software component of the plurality of software components,
      transmitting, in response to the request received, from the application portal, the particular one software component to the user device for execution in the controlled execution environment, wherein the application portal is configured to monitor the particular one software component at the user device and configured to automatically download to the user device a new version of the particular one software component in response to a release of the new version;
      receiving a request from the particular one software component for data from a specified data provider;
      in response to receiving, by the application portal, the request for the data from the specified data provider, determining that the particular one software component may access the data from the specified data provider if the specified data provider is operated by a party that operates the electronic delivery platform; and in response to determining that the particular one software component may access the data from the specified data provider, transmitting the data to the particular one software component executing on the user device wherein the particular one software component uses the transmitted data.

15. The electronic delivery platform of claim 14, wherein the application portal is configured to output to a display.

16. The electronic delivery platform of claim 15, wherein the display is configured to display categories of the plurality of software components available on the application portal.

17. The electronic delivery platform of claim 16, wherein the display is configured to display the categories of the plurality of software components in a right-hand pane, wherein the categories of the plurality of software components comprise automatic trading, customer relationship management, and data analysis, which are individually selectable, wherein upon selection of a category of the categories of the plurality of software components, the display is configured to display relevant software components, wherein the relevant software components are each individually selectable.

18. The electronic delivery platform of claim 16, wherein the display is configured to dynamically update featured software components of the plurality of software components based on an amount of time a software component of the plurality of software components has spent on a most downloaded list.

19. The electronic delivery platform of claim 15, wherein the display is configured to display information about the particular one software component, wherein the information comprises update dates of the particular one software component.

20. The electronic delivery platform of claim 15, wherein the display is further configured to allow the user to run a free demonstration of the software component as a one-time trial run or a trial run for a pre-determined time period.

\* \* \* \* \*